United States Patent [19]

Van Patten et al.

[11] Patent Number: 5,005,513
[45] Date of Patent: Apr. 9, 1991

[54] HYDROGEN GAS-FILLED BALLOON SIGNALLING SYSTEM

[75] Inventors: Norman Van Patten, 584 S. 1st East, Springville, Utah 84663; Blaine Van Patten, 16 LaVesta Verde-Rancho, Palo Verde, Calif. 90274; Vernon Dillenbeck, Orem, Utah

[73] Assignees: Norman Van Patten, Springville, Utah; Blaine Van Patten, Palo Verde, Calif.

[21] Appl. No.: 483,630

[22] Filed: Feb. 23, 1990

Related U.S. Application Data

[63] Continuation-in-part of Ser. No. 345,363, May 1, 1989.

[51] Int. Cl.⁵ .............................................. B64B 1/50
[52] U.S. Cl. ............................ 116/210; 116/DIG. 9; 206/803; 244/33
[58] Field of Search .......... 116/210, DIG. 8, DIG. 9; 441/30, 31, 98–101; 206/573, 803; 446/220, 224; 40/214; 244/31, 33, 98

[56] References Cited

U.S. PATENT DOCUMENTS

| | | | |
|---|---|---|---|
| 3,419,361 | 12/1968 | Bratton et al. | 422/165 |
| 3,461,835 | 8/1969 | Cockbill et al. | 116/210 |
| 4,123,987 | 11/1978 | Singerle et al. | 116/277 |
| 4,185,582 | 1/1980 | Bryant | 116/210 |
| 4,341,651 | 7/1982 | Beckert et al. | 252/188.25 |
| 4,929,214 | 5/1990 | Liebermann | 446/221 |

FOREIGN PATENT DOCUMENTS

| | | | |
|---|---|---|---|
| 1188951 | 3/1965 | Fed. Rep. of Germany | 244/98 |
| 1472902 | 3/1967 | France | 441/98 |

Primary Examiner—Allan N. Shoap
Assistant Examiner—W. Morris Worth
Attorney, Agent, or Firm—Thorpe, North & Western

[57] ABSTRACT

A balloon signalling system which includes a hollow flexible casing having a container section with an upper open end and a bottom closed end, and a cap for placement on the upper end of the container section. A hollow flexible flask having an opening is disposed in the container section. Disposed in the flask is a reactable material which when contacted by a certain solution, produces hydrogen gas. Also disposed in the flask is a cartridge which is breakable when bent, with the cartridge containing the certain solution. A string or other tether is held in the container section of the casing, with one end of the string being attached to the casing. Also included is an inflatable balloon dimensioned to fit in the cap when deflated and having a mouth through which gas may pass into and out of the balloon. Positioned in the mouth is a one-way valve for allowing hydrogen gas to enter the balloon and for preventing discharge of gas therefrom. A tube connects the opening of the flask to the valve to carry hydrogen gas from the flask to the balloon to inflate the balloon. The other end of the string is attached to the balloon.

12 Claims, 1 Drawing Sheet

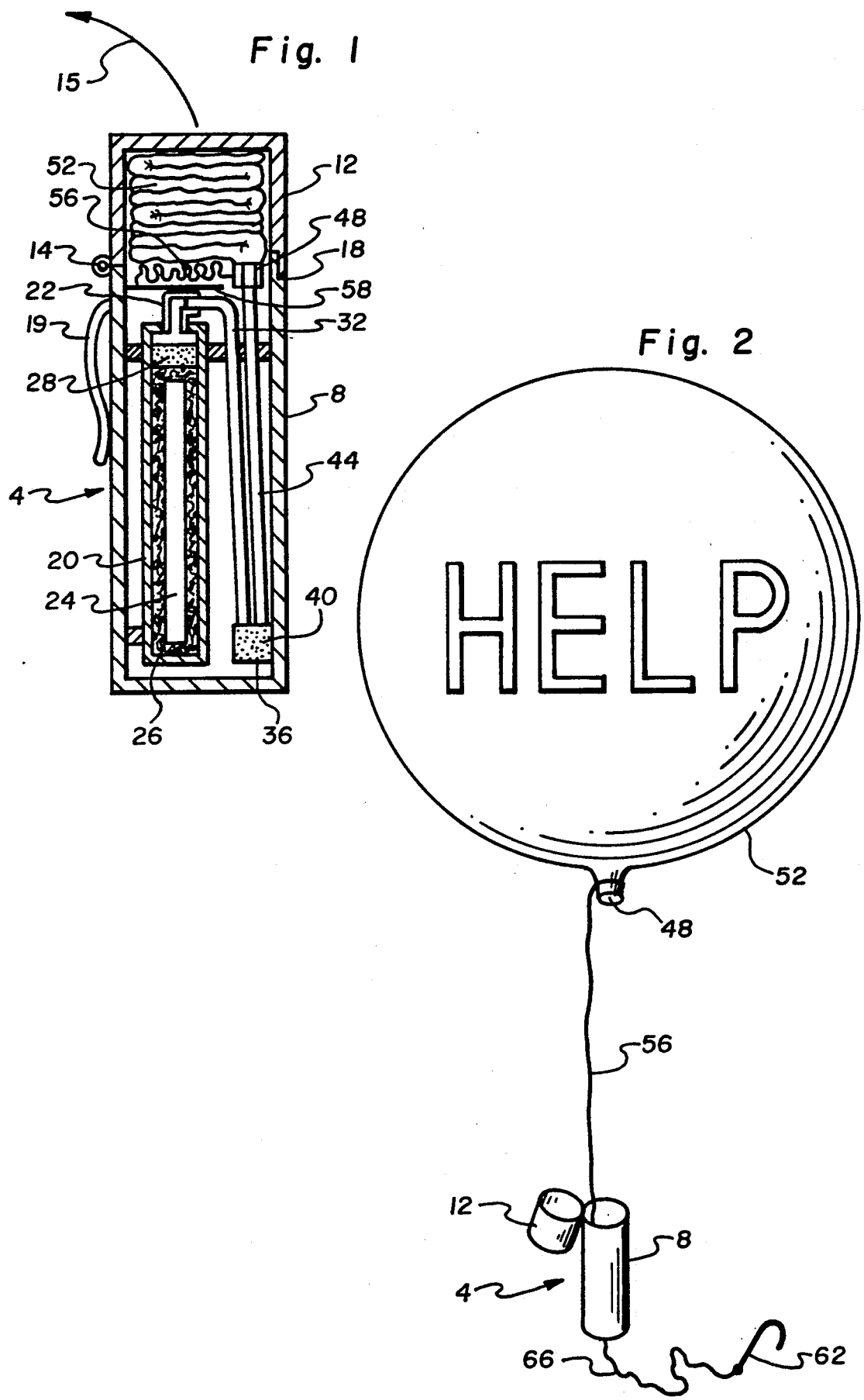

HYDROGEN GAS-FILLED BALLOON SIGNALLING SYSTEM

This is a continuation-in-part of application Ser. No. 07/345,363 filed May 1, 1989.

BACKGROUND OF THE INVENTION

This invention relates to a compact, portable balloon signalling system by which a person may identify his/her location if lost or injured.

Emergency signalling systems utilizing inflatable balloons have been known for some time as evident by U.S. Pat. Nos. 2,862,531, 3,381,655, 3,735,723, 3,941,079, 4,094,267, 4,416,433 and 4,800,835. Such devices are designed generally to allow for inflation and elevation of a balloon to mark the location of a lost or injured party. These devices are especially useful in heavily wooded, mountainous or remote locations. The balloon, which is elevated above the person in distress, is more easily seen by both airborne and ground based search parties than would be the distressed person himself, to thus enable the rapid location and bringing of aid to the person.

The devices heretofore proposed have typically been either cumbersome, bulky and difficult to manipulate and use or overly complicated in construction and thus quite costly.

SUMMARY OF THE INVENTION

It is an object of the invention to provide a simple and inexpensive balloon signaling device for indicating location of a person in distress.

It is also an object of the invention to provide such a device which is simple to use and operate.

It is an additional object of the invention to provide a compact, portable balloon signalling device easily carried by a person in a coat or shirt pocket.

It is another object of the invention to provide such a device which is rugged and reliable.

The above and other objects of the invention are realized in a specific illustrative embodiment of a balloon signalling system which includes a hollow flexible casing having a container section with an upper open end and a bottom closed end, and a cap for placement on the upper end of the container section. A hollow flexible flask having an opening is disposed in the container section. Disposed in the flask is a reactable material which when contacted by a certain solution, produces hydrogen gas. Also disposed in the flask is a cartridge which is breakable when bent, with the cartridge containing the certain solution. A string or other tether is held in the container section of the casing, with one end of the string being attached to the casing. Also included is an inflatable balloon dimensioned to fit in the cap when deflated and having a mouth through which gas may pass into and out of the balloon. Positioned in the mouth is a one-way valve for allowing hydrogen gas to enter the balloon and for preventing discharge of gas therefrom. A tube connects the opening of the flask to the valve to carry hydrogen gas from the flask to the balloon to inflate the balloon. The other end of the string is attached to the balloon.

When the cap is removed and the casing is bent, the cartridge is broken to release solution into the flask and into contact with the reactable material. Hydrogen gas is thus produced to flow through the tube to inflate the balloon. When the balloon is inflated to a certain volume, it will begin to rise and pull the valve from the end of the tube. The balloon continues to rise, pulling the string from the casing, until the length of the full length of the string is played out. Of course, selection of the string length will determine the height to which the balloon can reach to signal the location of the person using the device.

BRIEF DESCRIPTION OF THE DRAWINGS

The above and other objects, features and advantages of the invention will become apparent from a consideration of the following detailed description presented in connection with the accompanying drawings in which:

FIG. 1 is a side cross-sectional view of a balloon signally system made in accordance with the principles of the present invention; and FIG. 2 shows the system of FIG. 1 with the balloon inflated above the casing in which the balloon is initially packed.

DETAILED DESCRIPTION

Referring to the drawings, there is shown a balloon signalling system which includes a hollow, generally cylindrical casing 4 (FIG. 1) comprising a lower container section 8 and an upper cap section 12. The cap section 12 includes a hinge 14 (or could be a thin, bendable plastic joint) joining the cap section to the lower container section 8 to pivot upwardly and outwardly from the container section. The cap section 12, when pivoted onto the container section 8, rests on a shoulder 18 formed in the side wall of the container section.

The casing 4 has a long dimension of about six inches to one foot, and a diameter of about one-half inch to three inches, to enable carrying the casing in a coat pocket. A clip 19 is provided on the container section 8 to allow inserting and holding the casing 4 in a deep pocket, inside a belt, or the like. The casing 4 is made of a flexible material such as a soft plastic or other resilient bendable material.

Disposed in the container section 8 of the casing 4 is a flexible flask 20 having a nozzle 22 at the top for allowing communication with the interior of the flask. The flask 20 might also be made of a soft plastic or other resilient bendable material.

Positioned in the flask 20 is a breakable cartridge 24 made, for example, of glass. The cartridge 24 contains water. Also disposed in the flask 20 about the cartridge 24 is a reactable material 26, such as pelletized sodium borohydride, which causes production of hydrogen gas when contacted by water. A filter 28 is positioned above the reactable material 26 and cartridge 24 in the flask 20 to filter and absorb water vapor which may be carried by hydrogen gas rising in the flask.

Connected to the nozzle 22 of the flask 22 is a flexible tube 32 which extends downwardly along the side of the flask to a container 36 holding a second filter 40 for further filtering water from hydrogen gas. The filters 28 and 40 might illustratively comprise resilient sponge or foam suitable for absorbing water.

A second tube 44 extends from the container 40 upwardly along side the first tube 32 to an elevation generally above the top of the flask 20. At this position a one-way nozzle-valve 48 may be fitted over the upper end of the tube 44 to receive hydrogen gas flowing through the tube. The nozzle-valve 48 is disposed in the mouth of a balloon 52. A tether or string 56 is wadded up on a platform 58 and connected at one end to the wall of the casing 4 (or platform 58) and at the other end to and about the mouth of the balloon 52 and nozzle-valve 48. The string 56 could be conventional fishing line, twine, or the like.

The balloon 52 is dimensioned so that when folded, as shown in FIG. 1, it would fit within the cap section 12 of the casing 4 when the cap section is pivoted onto the container section 8. The balloon 68 is of sufficient size such that when filled with hydrogen gas, it will rise upwardly to provide a signal that someone is in distress. The word "HELP" is painted or inscribed onto the balloon 52 to indicate to an observer that there is a distress situation needing assistance. The balloon could be of conventional design and fabrication and be made of rubber, resilient plastic, or the like.

In use, the balloon 52 would be folded to fit within the cap section 12 of the casing 4, the nozzle-valve 48 fitted over the upper end of tube 44, and the cap section then closed onto the container section 8 to allow convenient storing or carrying of the casing. For example, the casing could be slipped into a pocket or inside a belt, with the clip 16 placed over the edge of the pocket or over the belt to hold the casing in place. Then, when the party using the device was put in a distress situation where he/she needed to signal for help, the cap section 12 would be pivoted from the container section 8 to thereby expose the balloon 68. The lower container section 8 would then be bent until the cartridge 24 breaks to release water into contact with the reactable material 26. Upon such contact, hydrogen gas is produced in the flask 20 and this gas flows through filter 28, nozzle 22, tube 32, container 36 and filter 40, tube 44 and nozzle-valve 48 into the balloon 52 to inflate the balloon. As the balloon 52 inflates, it will reach a point where it has sufficient buoyancy to pull the nozzle-valve 48 from the upper end of the tube 44, and rise upwardly as shown in FIG. 2. The stringed 56, which is attached to the balloon mouth, is pulled upwardly from its bunched position in the container section 8. The balloon 52 will continue to rise until all of the string 56 has played out from the casing 4 except the end which is joined to the casing, at which time the string will prevent further elevation of the balloon. The container section 8 of the casing 4 will be held and retained by the person producing the signal so that it does not rise with the balloon. Alternatively, a hook 62 and tether 66 attached to the bottom of the container section 8 could be further tied to a tree or rock so that the person in distress would not need to continue holding onto the container section 8. When help arrived, the person in distress could simply pull in the string and fold the balloon 52, after allowing release of the gas from the balloon, into the cap section 12. The flask 20 and its contents could later be replaced to allow rerise of the signalling device.

In the manner described, a simple, easy-to-use, rugged and effective balloon signalling device is provided.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. For example, the valve 48 could be made rotatable, rather than slidable, to cover and block the bore 50 in one position and allow passage of gas in another position.

What is claimed is:

1. A balloon signalling system comprising
   a hollow resilient casing having a container section with an upper open end and a bottom closed end, and a cap placeable on and removable from the upper end of the container section,
   a hollow resilient flask having an opening and removably disposed in the container section of the casing,
   a reactable material disposed in the flask,
   a breakable cartridge disposed in the flask with the reactable material and containing a solution which, when it contacts the reactable material, produces hydrogen gas, wherein said casing is bent until the cartridge breaks to release the solution,
   an inflatable balloon having an opening for receiving hydrogen gas to be inflated thereby, said balloon being collapsible to fit within the casing above the flask,
   a nozzle means disposed in the balloon opening for allowing hydrogen gas to enter and inflate the balloon, and for preventing the escape of hydrogen gas from the balloon, said nozzle including receiving means for releaseably receiving the end of a tube,
   a tube coupling the opening of the flask to the receiving means of the nozzle means for carrying to the balloon hydrogen gas produced in the flask, to thereby inflate the balloon and cause it to rise from the casing and pull the nozzle means off the tube, and
   tether means attached to the balloon or nozzle means for holding the balloon from rising above a certain altitude.

2. A signalling system as in claim 1 wherein said solution comprises water.

3. A signalling system as in claim 2 wherein said reactable material comprises sodium borohydride.

4. A signalling system as in claim 3 wherein said sodium borohydride comprises a plurality of pellets.

5. A signalling system as in claim 1 wherein said cartridge is made of glass.

6. A signalling system as in claim 1 further including a filter means disposed in the path of flow of hydrogen gas from the flask to the balloon, to filter solution from the gas.

7. A signalling system as in claim 1 wherein the opening in the flask is located in the top thereof, wherein said tube extends from the opening of the flask downwardly along one side of the flask to an elbow and then upwardly to near the top of the flask, and wherein said system further includes a first filter means disposed in the flask near said opening for absorbing solution passing therein, and a second filter means disposed in the tube at the elbow to further absorb solution passing thereinto.

8. A signalling system as in claim 7 wherein said first and second filter means comprise foam material.

9. A signalling system as in claim 8 wherein said foam material is made of resilient rubber.

10. A method of signalling for help comprising
    providing a bendable canister and a cap placeable onto and removable from the canister, an inflatable balloon fittable in the cap when deflated and having a mouth through which gas may pass into and out of the balloon, a bendable flask disposed in the canister, a reactable material disposed in the flask, a breakable cartridge also disposed in the flask containing a solution which, when it contacts the reactable material, produces hydrogen gas, a nozzle valve disposed in the mouth of the balloon for allowing passage of hydrogen gas into, but not out of, the balloon, hydrogen gas conveying means releasably connected to the nozzle valve and to the flask to convey hydrogen gas produced in the flask to the balloon, and a tether attached to the balloon to prevent the balloon from rising above a certain elevation, removing the cap from the canister to expose the balloon, and bending the canister to break the cartridge to release solution to contact the reactable material and produce hydrogen gas which flows via the conveying means to inflate the balloon so that the balloon rises upwardly.

11. A method as in claim 10 wherein said solution is water, said method further comprising the step of filtering water from hydrogen gas flowing from the flask to the balloon.

12. A method as in claim 10 further including inflating the balloon to a size to enable the buoyancy of the balloon to pull the valve nozzle away from the conveying means.

* * * * *